(12) United States Patent
Di Federico et al.

(10) Patent No.: US 11,886,200 B2
(45) Date of Patent: Jan. 30, 2024

(54) SYSTEM FOR MONITORING STABILITY OF OPERATION OF AUTONOMOUS ROBOTS

(71) Applicant: Topcon Positioning Systems, Inc., Livermore, CA (US)

(72) Inventors: Ivan Giovanni Di Federico, Argenta (IT); Lev Borisovich Rapoport, Moscow (RU); Alexey Anatolievich Generalov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 506 days.

(21) Appl. No.: 17/284,506

(22) PCT Filed: Aug. 19, 2020

(86) PCT No.: PCT/RU2020/000441
§ 371 (c)(1),
(2) Date: Apr. 12, 2021

(87) PCT Pub. No.: WO2022/039614
PCT Pub. Date: Feb. 24, 2022

(65) Prior Publication Data
US 2022/0300006 A1    Sep. 22, 2022

(51) Int. Cl.
*G05D 1/02* (2020.01)
*G05D 1/00* (2006.01)

(52) U.S. Cl.
CPC ......... *G05D 1/0257* (2013.01); *G05D 1/0088* (2013.01); *G05D 1/0094* (2013.01); *G05D 1/0212* (2013.01)

(58) Field of Classification Search
CPC .. G05D 1/0257; G05D 1/0088; G05D 1/0094; G05D 1/0212
See application file for complete search history.

(56) References Cited

U.S. PATENT DOCUMENTS 8,224,525 B1    7/2012  Rapoport et al.
2018/0333853 A1*  11/2018  Cousins ............... G05D 1/0276

FOREIGN PATENT DOCUMENTS

CN    110326033 A    11/2019
CN    110716565 A     1/2020
(Continued)

OTHER PUBLICATIONS

Drummond, Generalized Absolute Stability Using Lyapunov Functions With Relaxed Positivity Conditions, Apr. 2018, IEEE Control Systems Letters, vol. 2, No. 2, (Year: 2018).*
(Continued)

*Primary Examiner* — Jess Whittington
*Assistant Examiner* — Terry C Buse
(74) *Attorney, Agent, or Firm* — Bardmesser Law Group (57) ABSTRACT

System for monitoring stability of autonomous robot, including a GNSS navigation receiver including antenna, analog front end, plurality of channels, inertial measurement unit (IMU) and a processor, all generating navigation and orientation data for the robot; based on the navigation and orientation data, calculating position and direction of movement for the robot; calculating spatial and orientation coordinates $z_1$, $z_2$ of the robot, relating to the position and direction of movement; continuing with programmed path for the robot for any spatial and orientation coordinates $z_1$, $z_2$ within an attraction domain, where a measure $V(z)$ of distance from zero in $z_1$, $z_2$ plane are defined by Lurie-Postnikov functions and is less than 1; for spatial and orientation coordinates outside the attraction domain with $V(z)>1$, terminating the programmed path and generating notification.

11 Claims, 5 Drawing Sheets

(56) References Cited

FOREIGN PATENT DOCUMENTS

| JP | WO 2021/153176 | * | 1/2020 | ............... | G05D 1/02 |
| JP | WO-2021/153176 | * | 8/2021 | ............... | G05D 1/02 |
| WO | 2019204296 A1 | | 10/2019 | | |

OTHER PUBLICATIONS

Search Report in PCT/RU2020/000441, dated Nov. 12, 2020.

* cited by examiner

SYSTEM FOR MONITORING STABILITY OF OPERATION OF AUTONOMOUS ROBOTS

BACKGROUND OF THE INVENTION

The present invention relates to autonomous robotic systems, and, more particularly, to predictable robot behavior. The invention also relates to the construction of special attraction domains and maintaining such a behavior that the state of the robot belongs to these domains and moves in a stable manner.

DESCRIPTION OF THE RELATED ART

The use of autonomous mobile robots (AMRs) in various industrial applications has become widespread. They are used in industrial and civil transportation, mechanical assembly shops, agricultural fields, construction sites. In most applications robots are potentially coming in contact with inhabited environment, obstacles, and other surrounding entities and can be harmful due to equipment malfunction or firmware problem. So, while improving the efficiency of industrial operation, these robots become sources of potential danger when operating improperly. While these robots were designed to navigate safely around people, other robots, and surrounding environment, ongoing changes in the environment, external impacts, fast changes of operation modes can bring the robot out of predictable stable motion.

In order to formalize the situation of stability loss and diagnose it at an early stage, it is necessary to teach the robot to understand that it is losing stability, so that it can take additional actions. Safety standards and laws are determined locally by country or region. Thus, operation of AMRs must meet those local standards. On the other hand, independently of certain standards, the safe operation has common general features that current discussion deals with.

The robot is considered as a nonlinear dynamic mechanical system (see [1]), described for example by ordinary differential equations. One of the fundamental problems of nonlinear control systems analysis is a description of the attraction domain of the stable operation mode. Usually the equilibrium refers to the nominal system's operation, which should be stabilized. Complete solution of this problem in general form is extremely hard. Therefore, an approximate estimate of the attraction domain is typically used in applications. Usually engineers are looking for an estimate of a domain that combines two properties: it should provide attraction and be invariant. By invariance we mean such a property of the domain, that the trajectory of the system, once getting inside, will no longer leave it.

A standard approach for constructing such estimates uses Lyapunov functions from certain parametric classes. Let $x \in R^n$ (n-dimensional Euclidean space) be the system state. Entries of this vector are coordinates, velocities, orientation angles and angular rates. Given the Lyapunov function $V(x)$, the estimate of the attraction domain is constructed as a level set $\{x:V(x) \leq \alpha\}$, provided the time derivative with respect to the system dynamics is negative: $\dot{V}<0$ (see [1]). The constant $\alpha$ controls the size of the attraction domain. The larger the constant, the wider will be the domain. Thus, using a series of constants, a series of attraction domains will be generated. The attraction domain corresponding to the smaller constant will belong to the domain corresponding to the larger constant. Thus, the function $V(x)$ generates series of nested domains, each one is invariant and guarantees attraction to the desired operation mode. The most outer and widest domain corresponds to the largest possible constant. Each constant value can be associated with its own color of indication on the display in the monitoring center.

Candidates for use as a Lyapunov function are selected from some parametric class. Thus, the more general is the parametric class of Lyapunov functions, the more freedom of choice exists, and the less conservative is the resulting estimate of the attraction domain. A desire to maximize the volume of the attraction domain leads to the problem of optimal parameters choice. In general, the wider is the attraction domain, the wider is set of states for which the safe behavior is guaranteed. If the current state does not belong to the estimate of the attraction domain, the system identifies itself as being in unsafe condition and therefore, additional actions must be taken. For example:

the engine must be stopped and the flashing light is on, additional jacks must be released,
operation must be switched to the backup algorithm or the search mode.

What is most significant, the problem will be detected at an early stage before the system begins to show instability and necessary actions will be taken beforehand.

As an exemplary application, stabilization of the planar motion of a wheeled robot is considered. It is assumed that the four wheels platform moves without slipping. The rear wheels are assumed to be driving, while the front wheels are responsible for the rotation of the platform. The control goal is to drive the target point to the desired trajectory and to stabilize its motion along the desired trajectory. Here, we restrict ourselves to the case of motion along a straight path for simplicity. The control function is obtained by the feedback linearization method and is subject to the two-sided constraints as described for example in paper [2]. To estimate attraction domain of the closed loop system the quadratic Lyapunov function was used in [2] and [3]. In the patent [3] an ellipsoidal estimate of the attraction domain is proposed to use as an operator prompt.

Parameters to be chosen in [2], [3] were entries of the positive definite square matrix. In the discussion below, we propose more general class of Lyapunov functions which are supposed to be a quadratic form plus an integral of nonlinearity multiplied by an unknown scalar, which is also a parameter to be chosen. These functions are called Lurie-Postnikov functions [4].

The use of attraction domains in automatic control systems of wheeled robots is explained in [2] and partially in [3] as assistance to the operator. The AMR operation excludes the presence of people at all in all potential areas such as small wheeled robots for precise agriculture, golf course lawn mowers, and so on. The common challenge for these areas is to make the robot behavior reliable and fully predictable, including safe and secure operation [5].

Another significant part of the wheeled robot operation planning is the motion planning. It will be assumed that the optimal field coverage problem was already solved for a certain working site and a desired trajectory was obtained as a result. One can assume, that the AMR or group of AMRs is delivered first to the neighborhood of the working site and left alone in arbitrary position near the beginning of the pre-planned path. The autonomous control goal is to bring the robot to the desired start of the planned path and stabilize the motion of the robot's target point along it. Also, it should be ensured that the control algorithm will not cause system stability loss. This means that the robot should get inside the attraction domain of the dynamic system closed by a synthesized control function, thus guaranteeing the asymptotic stability of the whole system. For the case of the group of AMRs it means that the group state should be inside the attraction domain. In addition, even starting sufficiently close to the target trajectory, the robot may perform large oscillations going relatively far even if the closed loop system is stable. Thus, the estimate of attraction domain subjected to reasonable geometric constraints is desired to be invariant: once getting inside it, the system trajectories should not leave it and never violate constraints.

SUMMARY OF THE INVENTION

The object of this invention is to propose a method of attraction domain estimation in the state space of the system. It must be as little conservative as possible. Particularly, it must be less conservative than earlier investigated ellipsoidal estimates [2], [3]. Description of the attraction domain inscribed into the union of bands of certain width for each state variable around the nominal stable state, guaranteeing prescribed exponential stability rate, is also considered. The optimal parameters choice problem is formulated. Results of this approach are illustrated in figures.

In one embodiment, a system for monitoring stability of an autonomous robot includes a GNSS navigation receiver including an antenna, an analog front end, a plurality of channels, an inertial measurement unit (IMU) and a processor, all generating navigation and orientation data for the robot; based on the navigation and the orientation data, calculating a position and a direction of movement for the robot; calculating spatial and orientation coordinates $z_1$, $z_2$ of the robot, which relate to the position and the direction of movement; continuing with a programmed path for the robot for any spatial and orientation coordinates $z_1$, $z_2$ within an attraction domain, such that a measure V(z) of distance from zero in a $z_1$, $z_2$ plane are defined by Lurie-Postnikov functions and is less than 1; and for any spatial and orientation coordinates outside the attraction domain with V(z)>1, terminating the programmed path and generating a notification.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

Figure 1:
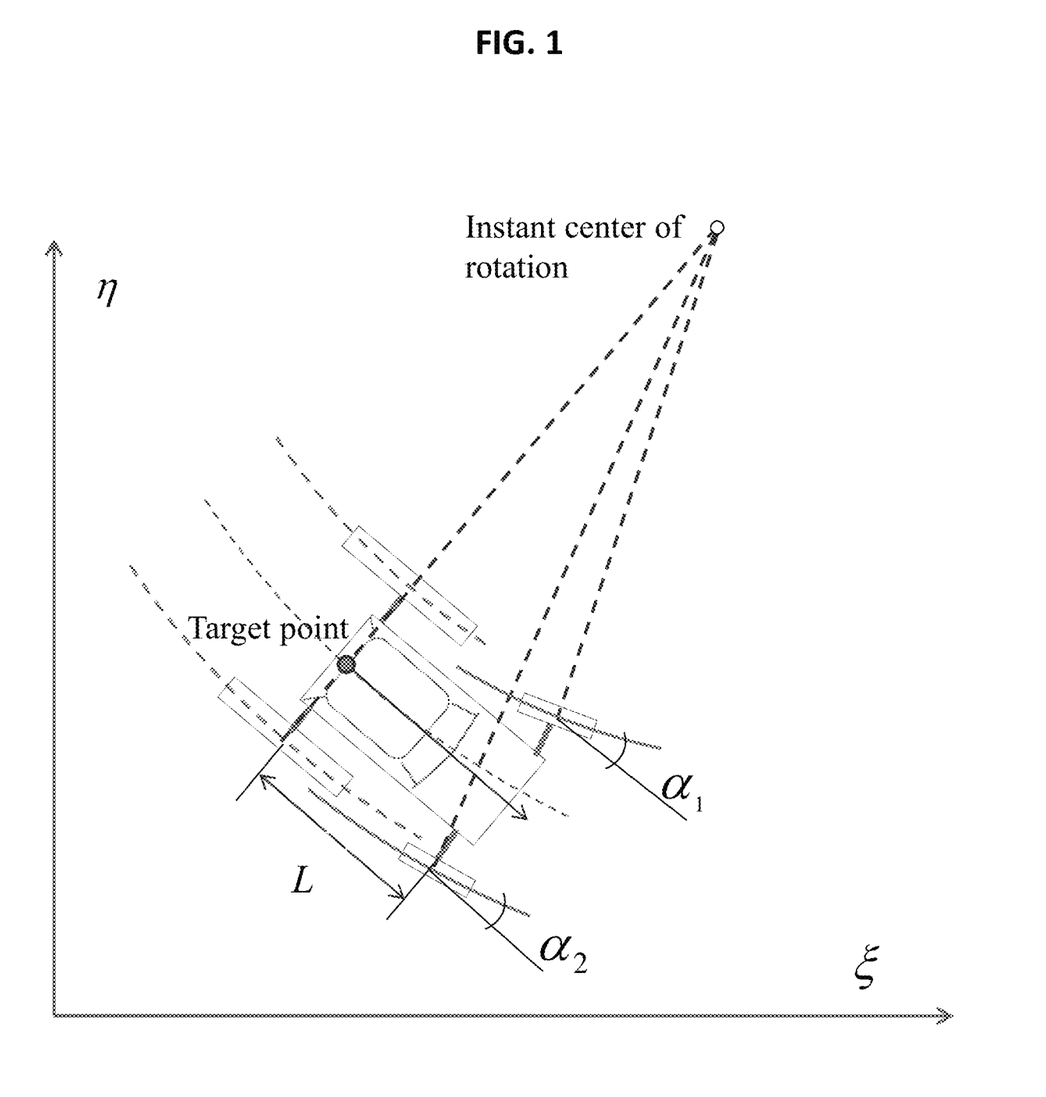
FIG. 1 illustrates the kinematic schematic of the wheeled robot.

A detailed description will be given for the wheeled robot model (agricultural tractor, lawn mower), although it will be understood the concept is applicable more broadly than just these types of devices. Consider the kinematic model of a wheeled robot, described, for example, in [2]. The model describes the platform with four wheels moving without lateral slippage (FIG. 1). The rear wheels are assumed to be driving and the front wheels responsible for steering of the platform. Two steering wheels can be schematically replaced with the one equivalent, see FIG. 2. The planar motion is described by position $\xi,\eta$ of the target point of the platform and angle $\psi$ describing the orientation of the platform with respect to the fixed reference system $O\xi\eta$. The target point is taken located in the middle of the rear axle, $\psi$ is the angle between the direction of the velocity vector of the target point and the $\xi$-axis. The set of GNSS and inertial sensors (accelerometers, gyroscopes) is used to estimate position of the target point in real time. The GNSS antenna or plurality of antennas is located on the body of AMR with best reception of the GNSS signal. The antenna position is then recalculated to the target point.

In the exemplary simple case the kinematic equations of the wheeled robot are:

$$\dot{\xi}=v \cos \psi,$$

$$\dot{\eta}=v \sin \psi,$$

$$\dot{\psi}=vu. \quad (1)$$

Here, the dot over a symbol denotes differentiation with respect to time, $v \equiv v(t)$ is a scalar linear velocity of the target point. In the general case the model may include description of the internal dynamics of actuators, interaction of tires with soil, backlash the steering shaft and other mechanical joints, other physical phenomena. What is significant, the description of the robot must be done in terms of differential equation, similar to (1), but probably more complex, including greater number of state variables.

Figure 2:
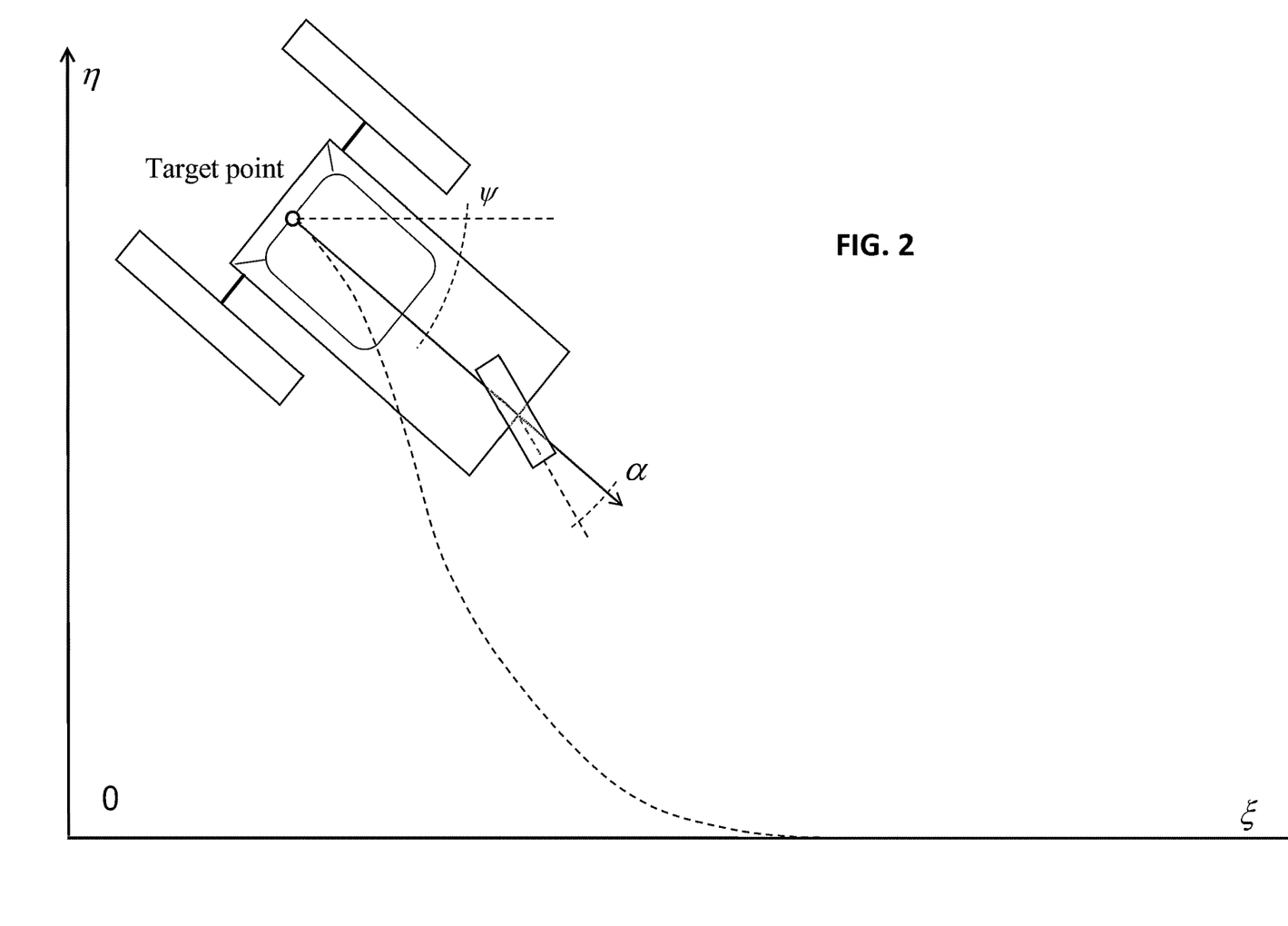
FIG. 2 illustrates the equivalent kinematic schematic with the single steering wheel.
Figure 3:
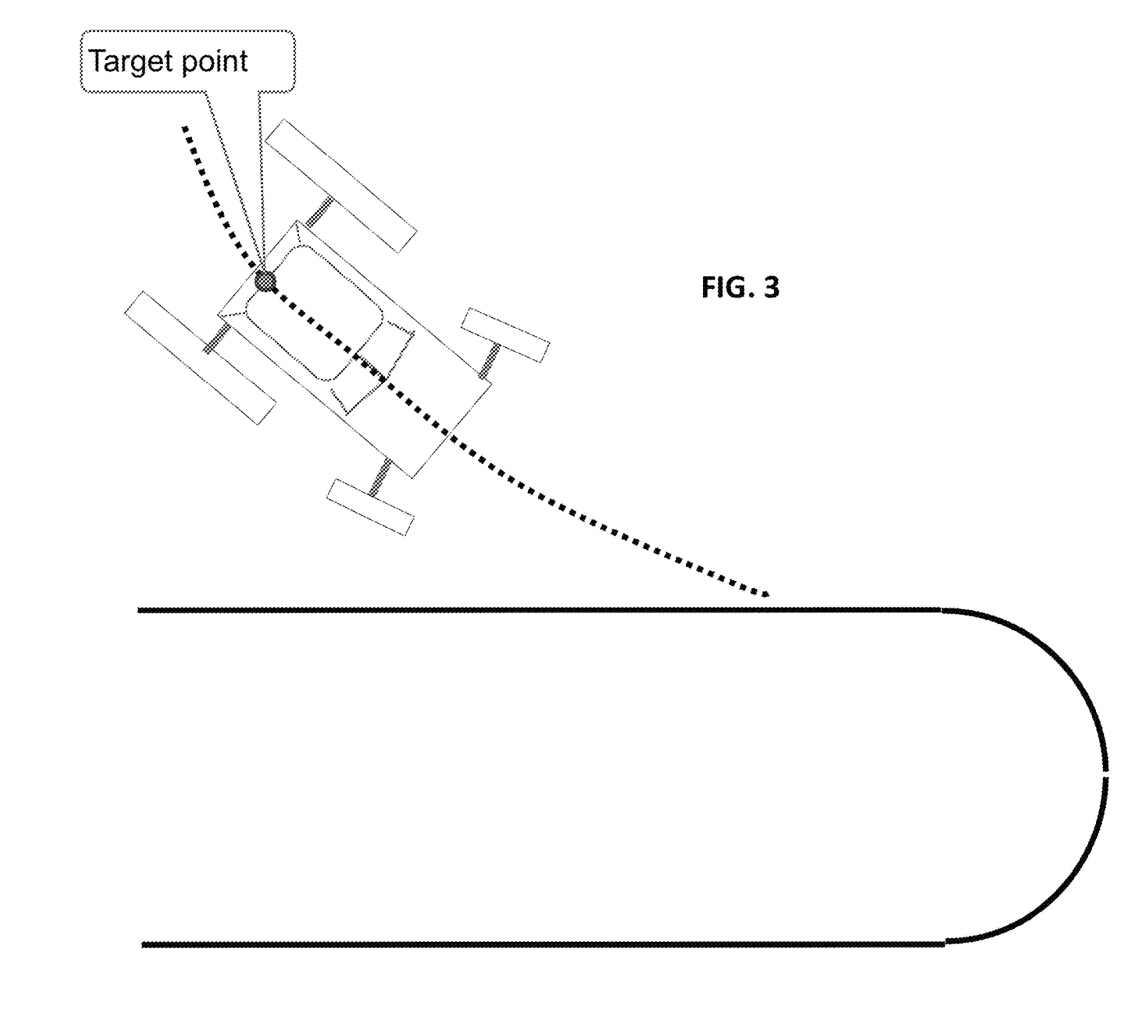
FIG. 3 illustrates the exemplary target path and the target point of the robot.

The control variable u is the instantaneous curvature of the trajectory circumscribed by the target point, which is related to the angle of rotation of the front wheels. The control goal is to stabilize the motion of the target point along the $\xi$-axis, when the lateral deviation $\eta$ and the angular deviation $\psi$ are equal to zero. The constraining condition of the control resources can be written as the two-sided constraints:

$$-\bar{u} \leq u \leq \bar{u}, \quad (2)$$

where $\bar{u}=1/R_{min}$ is the maximum possible curvature of the actual trajectory circumscribed by the target point and $R_{min}$ represents the minimum possible turning radius of the platform. Values $R_{min}$ and $\alpha_{max}$ are the maximum turning angle of the steering wheel, are related as $R_{min}=L/\tan \alpha_{max}$, where L is the distance between axles, see FIG. 1 and FIG. 2.

The model (1) can be further generalized for the case of any oblique straight line. It has been shown (see [2] for example) that, by changing the state variables and the independent variable, the straight path following problem can be written in the canonical form:

$$z'_1 = z_2,$$

$$z'_{2'} = u(1 + z_2^2)^{\frac{3}{2}}. \quad (3)$$

In (3), $z_1$ is the lateral deviation of the robot from the target path and $z_2=\tan \psi$, where $\psi$ is the angle between the direction of the velocity vector and the target path. The prime denotes differentiation with respect to the new independent variable $\xi$.

Ignoring two-sided constraints on control and using a feedback linearization technique [1] leads to the choice of control u in the form $$u = -\frac{\sigma}{\left(1+z_2^2\right)^{\frac{3}{2}}} \text{ for some } \lambda > 0 \text{ and } \sigma = \lambda^2 z_1 + 2\lambda z_2, \quad (4)$$

where $\lambda$ is desired rate of exponential decrease of the lateral displacement. Then the system (3) closed by the control function (4) in the feedback loop takes the form $$z_1' = z_2,$$

$$z_2' = -\sigma. \quad (5)$$

This system is equivalent to $z_1'' + 2\lambda z_1' + \lambda^2 z_1 = 0$, which implies the exponential convergence with rate $-\lambda$ of both $z_1$ and $z_2$. The particular form of function (4) determines poles of the closed-loop system (5). For the given function, the system has one pole $-\lambda$ of multiplicity 2. The other forms of the $\sigma$ function will imply different poles. The problem of pole placement is beyond the scope of this discussion, but generally a discussion may be found in literature, e.g., [9], incorporated by reference herein in its entirety.

However, in general, control (4) does not satisfy the two-sided constraints (2). Taking control in the form $$u = -s_{\bar{u}}\left(\frac{\sigma}{\left(1+z_2^2\right)^{\frac{3}{2}}}\right), \quad (6)$$

where $$s_{\bar{u}}(u) = \begin{cases} -\bar{u} & \text{for } u \leq -\bar{u}, \\ u & \text{for } |u| < \bar{u}, \\ \bar{u} & \text{for } u \geq \bar{u}, \end{cases} \quad (7)$$

may not guarantee that $z_1$ and $z_2$ decrease exponentially with given rate of exponential stability. Moreover, undesirable overshoot in variations of the variables is possible. Especially dangerous is overshoot in the variable $z_1$. This means that even starting sufficiently close to the target trajectory, the robot may perform large oscillations going far enough even if the closed loop system is stable [2].

Thus, even if the closed loop system maintains stable behavior, overshoots in the lateral displacement may happen, which may violate local geometry constraints. It means that the whole motion of the robot must be inscribed into guaranteed invariant domain, which is also the attraction domain.

Thus, we have finally arrived at the problem: how to describe the attraction domain inscribed into the band of certain width around axes $z_1$, $z_2$ and guaranteeing a prescribed exponential convergence rate. Equations in (3) take the form $$z_1' = z_2, \quad (8)$$

$$z_2' = -s_{\bar{u}}\left(\frac{\sigma}{\left(1+z_2^2\right)^{\frac{3}{2}}}\right)\left(1+z_2^2\right)^{\frac{3}{2}} = -\Phi(z_2, \sigma), \quad (9)$$

$$\Phi(z_2, \sigma) = \begin{cases} \bar{u}\left(1+z_2^2\right)^{\frac{3}{2}} & \text{for } \sigma \geq \bar{u}\left(1+z_2^2\right)^{\frac{3}{2}}, \\ \sigma & \text{for } |\sigma| < \bar{u}\left(1+z_2^2\right)^{\frac{3}{2}}, \\ -\bar{u}\left(1+z_2^2\right)^{\frac{3}{2}} & \text{for } \sigma \leq -\bar{u}\left(1+z_2^2\right)^{\frac{3}{2}}. \end{cases}$$

This is everything needed to explore the absolute stability approach [4] for analysis of the nonlinear system (8), (9). The control system can now be rewritten in the form of closed-loop system with nonlinear feedback $$z' = Az + b\Phi(z_2, \sigma), \quad (10)$$

$$\sigma = c^T z, \quad (11)$$

where $$A = \begin{bmatrix} 0 & 1 \\ 0 & 0 \end{bmatrix}, \ b = \begin{bmatrix} 0 \\ -1 \end{bmatrix}, \ c = \begin{bmatrix} \lambda^2 \\ 2\lambda \end{bmatrix}, \ z = \begin{bmatrix} z_1 \\ z_2 \end{bmatrix}. \quad (12)$$

Given a positive value $\sigma_0$, assume that the variable $\sigma$ takes values from the interval $$-\sigma_0 \leq \sigma \leq \sigma_0. \quad (13)$$

Then the function (9) satisfies the sector constraints $$\frac{\bar{u}}{\sigma_0} \leq \frac{\Phi(z_2, \sigma)}{\sigma} \leq 1. \quad (14)$$

The absolute stability means the asymptotic stability of the system (8), (9), whatever nonlinearity there exists, can exist only if it satisfies the sector condition (14). In the absolute stability theory traditionally two classes of nonlinearities are considered:

(a) stationary (or time invariant) nonlinearity of the form $\Phi(\sigma)$, (b) non-stationary (or time-varying) nonlinearity of the form $\Phi(\xi, \sigma)$.

As shown in [4], the systems (a) are usually analyzed using Lyapunov functions from the Lurie-Postnikov class. The systems (b) are treated using quadratic Lyapunov functions. Lurie-Postnikov functions allow for less conservative absolute stability conditions comparing with those obtained by using quadratic functions. The problem with using Lurie-Postnikov functions for analysis of systems (b) is the need to take derivative over explicitly presented variable $\xi$. Here, we are analyzing the absolute stability of the system (8), with nonlinearity (9), depending on variables $z_2$ (implicitly depending on $\xi$) and $\sigma$. Thus, use of the Lurie-Postnikov function is extended for the class of nonlinearities (9). Using this approach, we obtain estimates of the attraction domain wider than estimates previously obtained using quadratic Lyapunov functions. The candidate for the Lyapunov function is taken in the form $$V(z) = z^T P z + \theta \int_0^{c^T z} \Phi(z_2, \sigma) d\sigma. \quad (15)$$

The symmetric positively definite 2×2 matrix P and the scalar $\theta$ must be chosen in such a way, that $$V'(z) = \frac{dV(z)}{d\xi} < 0 \text{ for all } z \neq 0. \quad (16)$$

Even more strong inequality guarantees exponential stability:

$$V'(z) + 2\mu V(z) < 0 \quad (17)$$

with exponential rate $-\mu$, $0 < \mu < \lambda$.

As already mentioned, we are looking for attraction domain of the form $$\Omega(\alpha) = \{z : V(z) \leq \alpha^2\}, \tag{18}$$

the constant $\alpha$ must be chosen to maximize the size of the set $\Omega(\alpha)$. Given P and $\theta$ the maximum size will be reached at the maximum possible $\alpha$ for which the condition (17) holds. The function (16) is homogeneous with respect to P and $\theta$. Therefore, we can set $\alpha=1$ and choose unknown parameters P and $\theta$ in such a way that the volume of $\Omega(1)$ will be maximized.

As an example of geometric constraints, we take a rectangular $$\Pi(a_1, a_2) = \{z : |z_1| \leq \alpha_1, |z_2| \leq \alpha_2\}. \tag{19}$$

Constraints (13) define the strip $|c^T z| \leq \sigma_0$ whose intersection with (19) gives $$\Pi(a_1, a_2, \sigma_0) = \{z : |z_1| \leq \alpha_1, |z_2| \leq \alpha_2, |c^T z| \leq \sigma_0\}. \tag{20}$$

Further, given $\sigma_0$ the sector constraint (14) can be rewritten in the form $$\left(\frac{\overline{u}}{\sigma_0} c^T z - \Phi(z_2, \sigma)\right)(\Phi(z_2, \sigma) - c^T z) \geq 0. \tag{21}$$

The function (9) satisfies (21) if only $\sigma$ satisfies (13).

The search for parameters P and $\theta$ ensuring the condition (17) in the domain $\omega(1)$ which, in turn, is inscribed in the region (19) is very complicated due to the complexity of the nonlinear function (9). Using the results of the theory of absolute stability, we replace a specific function (9) with a whole class of functions satisfying only condition (21). The plan is to construct the attraction domain, satisfying the geometry constraints, which is as follows. Find such parameters P and $\theta$, that:

(a) condition (17) is satisfied in (20) for every function $\Phi(z_2, \sigma)$ satisfying quadratic constraint (21),
(b) the domain $\Omega_0(1)$ is inscribed in $\Pi(a_1, a_2, \sigma_0)$.

We want to optimize the choice of parameters in such a way that the attraction domain is as wide as possible can be formulated in terms of minimization of the matrix trace $$tr(P) \to \min \tag{22}$$

under constraints (a) and (b) that, in turn, can be written as Linear Matrix Inequalities (LMI, see [6]) with respect to parameters P and $\theta$.

After a series of intermediate algebraic computations, which we omit, we present the final algorithm, including semidefinite optimization for which any of convex optimization packages can be used (see for example [7]). Note that convex optimization is numerically tractable and allows a very efficient computer implementation.

Denote $\beta_0 = \frac{\overline{u}}{\sigma_0}, e - (0,1)^T,$ \hfill (23)

$$\beta_0 = \frac{\overline{u}}{\sigma_0}, e = \begin{pmatrix} 0 \\ 1 \end{pmatrix}, T = \begin{bmatrix} -\beta_0 cc^T & \frac{1}{2}(\beta_0 + 1)c \\ \frac{1}{2}(\beta_0 + 1)c^T & -1 \end{bmatrix},$$

$$E = \frac{1}{2}\begin{bmatrix} ce^T + ec^T & -e \\ -e^T & 0 \end{bmatrix} \text{ and}$$

$$\text{sgn}\theta = \begin{cases} 1 & \text{for } \theta \geq 0, \\ -1 & \text{for } \theta < 0. \end{cases}$$

Let the matrices $Q(\theta, P)$ and $M(\theta, P)$ are defined by quadratic forms depending on the vector $$Y = \begin{pmatrix} z \\ \Phi \end{pmatrix} \in R^3:$$

$$Y^T Q(\theta, P) Y = \begin{cases} z^T P z + \theta \Phi\left(c^T z - \frac{1}{2}\Phi\right) \leq z^T P z + \theta \frac{(c^T z)^2}{2} & \text{for } \theta \geq 0, \\ z^T P z & \text{for } \theta \geq 0, \end{cases} \tag{25}$$

$$z^T M(\theta, P) z = \begin{cases} z^T P z & \text{for } \theta \geq 0, \\ z^T P z + \theta \frac{(c^T z)^2}{2} & \text{for } \theta < 0. \end{cases} \tag{26}$$

Assume that for given numbers $\overline{u} > 0$, $\sigma_0 > \overline{u}$, $\lambda > 0$, $0 \leq \mu < \lambda$, $a_1 > 0$, $a_2 > 0$, and $\gamma_0 = 1 + a_2^2$; the following Linear Matrix Inequalities (LMIs) in variables P, $\theta$, and $\tau_i \geq 0$, i=1, 2, 3, are feasible:

$$R(\theta, P) + 2\mu Q(\theta, P) + \tau_1 T - (3\theta \overline{u}^2 - \tau_2 \text{sgn}\theta) E \leq 0, \tag{27}$$

$$R(\theta, P) + 2\mu Q(\theta, P) + \tau_1 T - (3\theta \overline{u}^2 \gamma_0^2 + \tau_3 \text{sgn}\theta) E \leq 0, \tag{28}$$

$$\begin{bmatrix} M(\theta, P) & c \\ c^T & \sigma_0^2 \end{bmatrix} \geq 0, \tag{29}$$

$$M(P, \theta) - \begin{bmatrix} \frac{1}{a_1^2} & 0 \\ 0 & 0 \end{bmatrix} \geq 0, \quad M(P, \theta) - \begin{bmatrix} 0 & 0 \\ 0 & \frac{1}{a_2^2} \end{bmatrix} \geq 0, \tag{30}$$

then the domain $\Omega(1) \subseteq \Pi(a_1, a_2, \sigma_0)$ is an invariant estimate of the attraction domain of the system (3) under control (6). Moreover, along the trajectories of the system starting at $z(0) \in \Omega(1)$, the solution $z(\xi)$ decreases exponentially at the rate $-\mu$.

LMIs (27)-(30) define constraints of the semidefinite convex optimization problem. The cost function is defined as $$\min_{P, \theta} tr(M(\theta, P)). \tag{31}$$

Figure 4:
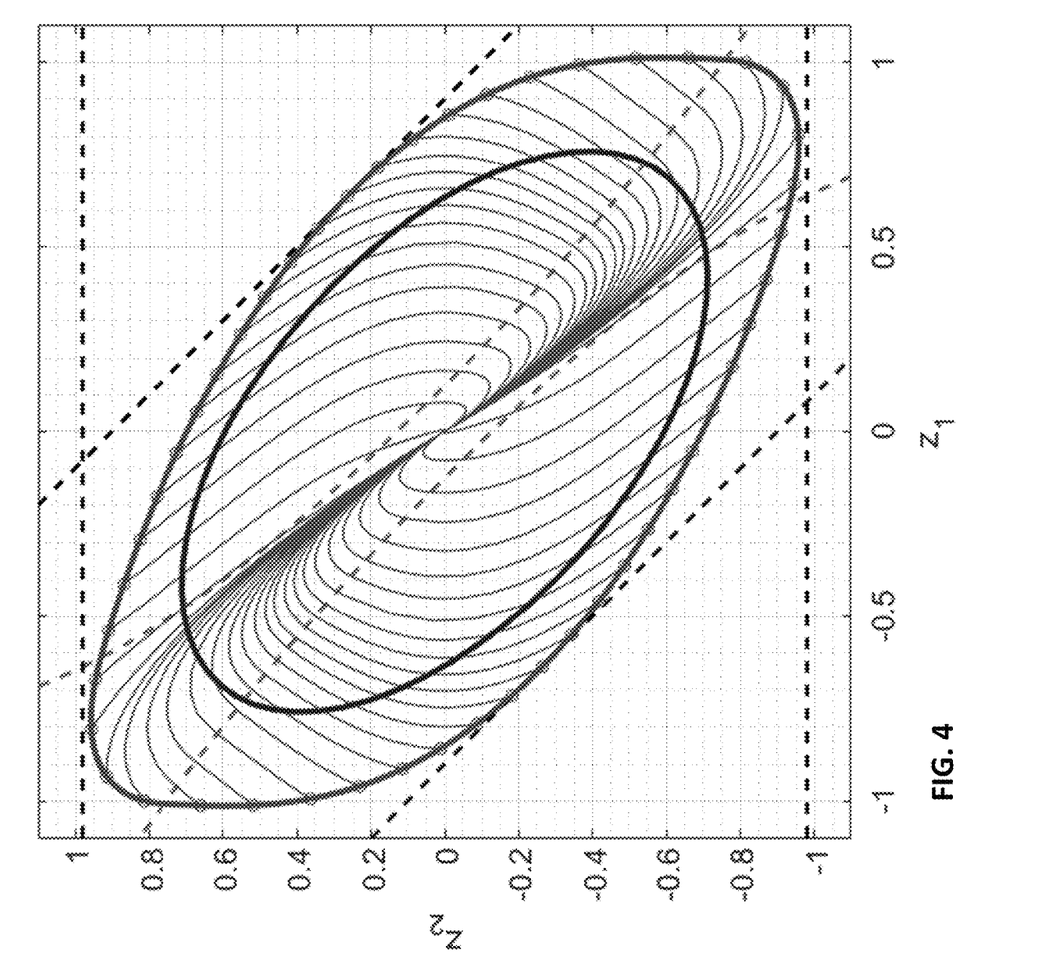
FIG. 4 illustrates the attraction domain constructed for the wheeled robot.

FIG. 4 shows an example of the attraction domain $\Omega(1)$ obtained for certain values, describing the problem.

Different wider class of geometry constraints, except those described in (19), can be described in terms of LMI's and included into convex optimization problem similar to the one described above.

Figure 5:
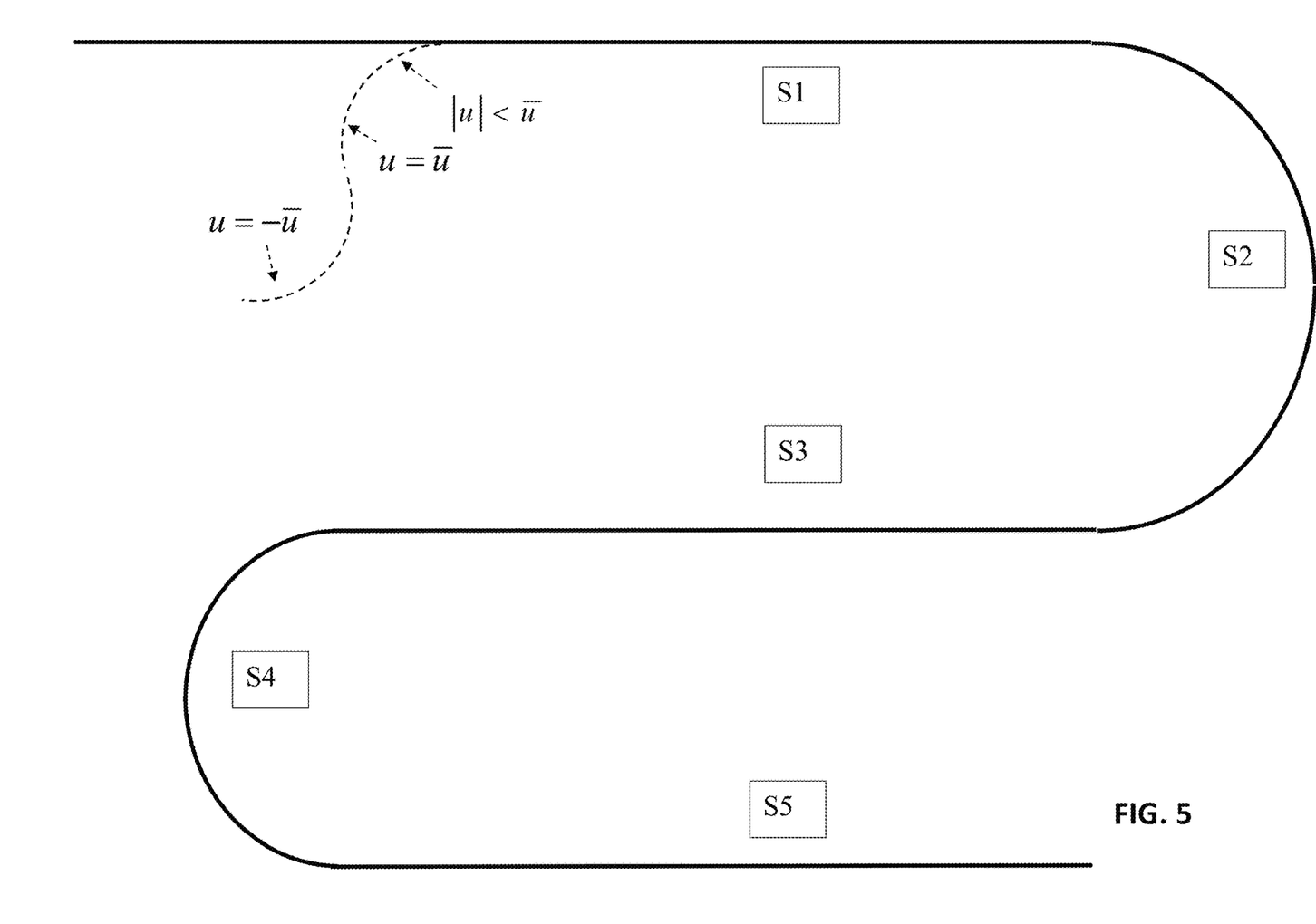
FIG. 5 illustrates the curvilinear path comprised of several segments.

The method proposed in this invention can be generalized to the case of curvilinear target paths (see [8]), like shown in FIG. 5 where the path consisting of several segments is shown, while the single straight line segment is considered in the invention description. Generalization to the case of several segments is straightforward.

Parameters P, $\theta$, and probably $\alpha \leq 1$ define the invariant attraction domain $\Omega(\alpha)$ which is stored in the internal memory of the onboard controller. The real state of the robot measured by GNSS and inertial sensors is further recalculated into variables $z_1$, $z_2$ which are further checked for condition $$\begin{pmatrix} z_1 \\ z_2 \end{pmatrix} \in \Omega(\alpha). \tag{32}$$

If (32) holds, then the onboard computer takes decision "status OK" and the robot continues autonomous operation. Otherwise, if the condition (32) fails, the onboard computer decides to take the status "alarm". The system identifies itself as being in unsafe condition and therefore, additional actions must be taken. For example:

the engine must be stopped and the flashing light is on, operation must be switched to the backup algorithm or the search mode (must be a subject of a separate patent).

If the robot is equipped with the light tower allowing multiple color lights, the "status OK" or "status alarm" decision can be further quantified in the following way:

if $(z_1, z_2)^T \in \Omega(\alpha)$ where $\alpha \leq 0.75$ (for example), the status is "OK" and the light has the green color, if $(z_1, z_2)^T \in \Omega(\alpha)$ where $0.75 < \alpha \leq 1$, the status is "OK but wide-awake" and the light has the yellow color, if (32) fails, the status is "alarm", the light is red, engine stopped, the message is sent to the central facility.

As will be appreciated by one of ordinary skill in the art, the various blocks and components of the receiver and robot control logic shown in the figures can be implemented as discrete hardware components, as an ASIC (or multiple ASICs), as an FPGA, as either discrete analog or digital components, and/or as software running on a processor.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

REFERENCES

Incorporated Herein by Reference in their Entirety

1. H. Khalil, Nonlinear Systems. Michigan State University, East Lansing. 2002. ISBN-13: 978-0130673893.
2. Rapoport L. B.: Estimation of Attraction Domains in Wheeled Robot Control. Automation and Remote Control. 67. (9), 1416-1435 (2006). DOI: 10.1134/S0005117906090062
3. U.S. Pat. No. 8,224,525B1 to Rapoport et al., Indication of Attraction Domains for Controlled Planar Motion of a Ground Vehicle. Jul. 17, 2012
4. Aizerman, M. A. and Gantmacher, F. R.: Absolute Stability of Regulation Systems. Holden Day, San Francisco (1964).
5. Cui J. and Sabaliauskaite G. On the alignment of safety and security for autonomous vehicles. In: Proceedings of IARIA CYBER, pp. 59-64. Barcelona (2017), ISBN: 978-1-61208-605-7
6. S. Boyd, S., Ghaoui, L. E., Feron, E., and Balakrishnan, V.: Linear Matrix Inequalities in System and Control Theory. SIAM, Philadelphia (1994).
7. Grant, M. and Boyd, S.: Graph implementations for nonsmooth convex programs. In: Recent Advances in Learning and Control (a tribute to M. Vidyasagar), Blondel, V., Boyd, S., and Kimura, H. (eds.), Lecture Notes in Control and Information Sciences, pp. 95-110. Springer (2008).
8. Pesterev A. V., Rapoport L. B.: Stabilization Problem for a Wheeled Robot Following a Curvilinear Path on Uneven Terrain. Journal of Computer and Systems Sciences International. 49. (4). 672-680 (2010). DOI: 10.1134/S1064230710040155
9. Polderman, J. W., A state space approach to the problem of adaptive pole placement, Math. Control Signals Systems. 2: 71-94 (1989). DOI:10.1007/BF02551362

What is claimed is:

1. A system for monitoring stability of an autonomous robot, the system comprising:

a Global Navigation Satellite System (GNSS navigation receiver including an antenna, an analog front end, a plurality of channels, an inertial measurement unit (IMU) and a processor programmed with a path for the autonomous robot, all generating navigation and orientation data for the autonomous robot;

based on the navigation and the orientation data, the system calculating a position and a direction of movement for the autonomous robot;

the system calculating spatial and orientation coordinates $z_1, z_2$ of the robot, which relate to the position and the direction of movement;

the system continuing with a programmed path for the robot for any spatial and orientation coordinates $z_1, z_2$ within an attraction domain, such that a measure $V(z)$ of distance from zero in a $z_1, z_2$ plane defined by $$V(z) = z^T P z + \theta \int_0^{c^T z} \Phi(z_2, \sigma) d\sigma,$$

where P is a 2 by 2 matrix
$z^T$ is $(z_1, z_2)^T$, T stands for transposition,
$\theta$ is a scalar coefficient,
$\Phi$ is a control function defined by $$\Phi(z_2, \sigma) = s_{\overline{u}}\left(\frac{\sigma}{\left(1+z_2^2\right)^{\frac{3}{2}}}\right)\left(1+z_2^2\right)^{\frac{3}{2}},$$

$$s_{\overline{u}}(u) = \begin{cases} -\overline{u} & \text{for } u \leq -\overline{u}, \\ u & \text{for } |u| < u, \\ \overline{u} & \text{for } u \geq \overline{u}, \end{cases}$$

$$\sigma = \lambda^2 z_1 + 2\lambda z_2,$$

$\lambda$ is a desired rate of exponential decrease of lateral displacement; and for any spatial and orientation coordinates outside the attraction domain, the system terminating the programmed path.

2. The system of claim 1, wherein, for any spatial and orientation coordinates within the attraction domain with a $0.75 < V(z) \leq 1$, continuing the programmed path with a "be on the look-out" status.

3. The system of claim 1, wherein, for any spatial and orientation coordinates within the attraction domain with a $V(z) \leq 0.75$, continuing the programmed path.

4. The system of claim 1, where the spatial and orientation coordinates $z_1, z_2$ are subject to a dynamic model that uses $$z_1' = z_2,$$

$$z_{2'}' = u\left(1+z_2^2\right)^{\frac{3}{2}}.$$

where u is a desired curvature of a path of a target point of the autonomous robot.

5. The system of claim 1, wherein the attraction domain is defined by $\Omega(\alpha)=\{z:V(z)\leq\alpha^2\}$, wherein $\alpha\leq 1$ is a measure of how deep into the attraction domain the autonomous robot is at present.

6. A system for monitoring stability of an autonomous robot, the system comprising:
- a Global Navigation Satellite System (GNSS)navigation receiver including an antenna, an analog front end, a plurality of channels, an inertial measurement unit (IMU) and a processor programmed with a path for the autonomous robot, all generating navigation and orientation data for the autonomous robot;
- based on the navigation and the orientation data, the system calculating a position and a direction of movement for the autonomous robot;
- the system calculating spatial and orientation coordinates zi, z2 of the autonomous robot, which relate to the position and the direction of movement;
- the system continuing with a programmed path for any spatial and orientation coordinates $z_1$, $z_2$ within an attraction domain, such that a measure $V(z)$ of distance from zero in a $z_1$, $z_2$ plane are defined by Lurie-Postnikov functions and is less than 1; and
- for any spatial and orientation coordinates outside the attraction domain with $V(z)>1$, the system terminating the programmed.

7. The system of claim 6, wherein the function V(z) is defined by $$V(z) = z^T P z + \theta \int_0^{c^T z} \Phi(z_2, \sigma) d\sigma,$$

where P is a 2 by 2 matrix
$z^T$ is $(z_1, z_2)^T$, T stands for transposition,
θ is a scalar coefficient, Φ is a control function defined by:

$$\Phi(z_2, \sigma) = s_{\overline{u}}\left(\frac{\sigma}{(1+z_2^2)^{\frac{3}{2}}}\right)(1+z_2^2)^{\frac{3}{2}},$$

$$s_{\overline{u}}(u) = \begin{cases} -\overline{u} & \text{for } u \leq -\overline{u}, \\ u & \text{for } |u| < u, \\ \overline{u} & \text{for } u \geq \overline{u}, \end{cases}$$

$$\sigma = \lambda^2 z_1 + 2\lambda z_2,$$

λ is a desired rate of exponential decrease of lateral displacement.

8. The system of claim 6, wherein, for any spatial and orientation coordinates within the attraction domain with a $0.75<V(z)\leq 1$, continuing the programmed path with a "be on the look-out" status.

9. The system of claim 6, wherein, for any spatial and orientation coordinates within the attraction domain with a $V(z)\leq 0.75$, continuing the programmed path.

10. The system of claim 6, where the spatial and orientation coordinates $z_1$, $z_2$ are subject to a dynamic model that uses $$z_1' = z_2,$$

$$z_{2'}' = u(1+z_2^2)^{\frac{3}{2}}.$$

where u is a desired curvature of a path of a target point of the autonomous robot.

11. The system of claim 6, wherein the attraction domain is defined by $\Omega(\alpha)=\{z:V(z)\leq\alpha^2\}$, wherein $\alpha\leq 1$ is a measure of how deep into the attraction domain the autonomous robot is at present.

* * * * *